United States Patent
Kaupp et al.

[11] 3,720,671
[45] March 13, 1973

[54] POLYCYCLIC DYESTUFFS

[75] Inventors: Günther Kaupp, Binningen; Jacques Voltz, Riehen, both of Basel-Land, Switzerland

[73] Assignee: Ciba-Geigy AG., Basel, Switzerland

[22] Filed: Oct. 5, 1970

[21] Appl. No.: 78,288

Related U.S. Application Data

[63] Continuation-in-part of Ser. No. 849,191, Aug. 11, 1969, abandoned.

[52] U.S. Cl. ................................260/249.5, 8/162 R
[51] Int. Cl. ............................................C07d 57/34
[58] Field of Search ....................260/249.5, 247.5 B

[56] References Cited

UNITED STATES PATENTS 3,452,013   6/1969   Gladych et al.................260/249.5 X Primary Examiner—John M. Ford
Attorney—Wenderoth, Lind & Ponack

[57] ABSTRACT

Polycyclic dyestuffs are disclosed which are of the formula

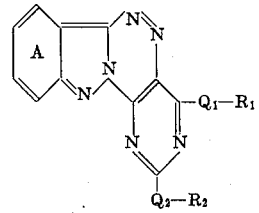

wherein any substituent of A is selected from hydrogen, nitro, halogen, lower alkyl, lower alkoxy and $SO_3M^+$, $Q_1$ and $_2$ denote preferably each a $-NZ-$ bridge wherein Z is hydrogen or lower alkyl and $R_1$ and $R_2$ denotes, independently of each other hydrogen or an optionally substituted hydrocarbon radical, preferably a lower alkyl radical.

These dyestuffs when free from water-solubilizing groups, such as $SO_3M^+$, are useful as dispersion dyestuffs for the dyeing or printing of hydrophobic, synthetic organic fiber material, such as cellulose 2½ or -tri-acetate especially however for the dyeing or printing of textile material made from polymeric esters of aromatic polycarboxylic acids with polyvalent alcohols. Dyestuffs which contain groups dissociating acid in water are useful for dyeing or printing of polyamide fibers.

The greenish-yellow, yellow and reddish-yellow dyeings are distinguished of high brilliancy and fluorescence as well as very good fastness to light and sublimation.

8 Claims, No Drawings

POLYCYCLIC DYESTUFFS

This application is a continuation-in-part of our pending patent application Ser. No. 849,191 filed Aug. 11, 1969, now abandoned.

DESCRIPTION OF THE INVENTION

The present invention relates to polycyclic dyestuffs processes for the production thereof, the use of said polycyclic dyestuffs for the dyeing or printing of organic material, especially the use of the difficultly water-soluble, polycyclic dyestuffs as dispersion dyestuffs for the dyeing or printing of hydrophobic organic fiber material and also, as an industrial product, the material dyed or printed with said polycyclic dyestuffs.

It has been found valuable polycyclic dyestuffs of the formula I

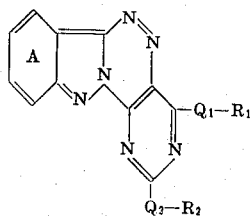

wherein the nucleus A may be further substituted, one of bridging members $Q_1$ and $Q_2$ represents an

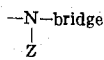

, and the other bridging member denotes oxygen, sulphur or the —NZ-bridge, wherein Z represents hydrogen or lower alkyl, each of $R_1$ and $R_2$ represents, independently of each other, hydrogen or an optionally substituted hydrocarbon radical or $Q_1$–$R_1$ or $Q_2$–$R_2$ represents, where $Q_1$ or $Q_2$ is NZ a heterocyclic radical, optionally including a further heteroatom.

Suitable substituents of the nucleus A are, besides hydrogen e.g. preferably the nitro group, halogen, lower alkyl, lower alkoxy and the sulphonic acid group $SO_3^-{}_M{}^{+A}$ wherein $M^+$ is one equivalent of a colorless cation.

As hydrocarbon radicals $R_1$ and $R_2$ represent, for example, straight-chained or branched, identical or different alkyl groups having up to eight, preferably one to five carbon atoms such as a methyl, ethyl, isopropyl, sec. butyl or tert. butyl group, a cycloalkyl group such as the cyclohexyl or 3,5,5-trimethylcyclohexyl group, a phenyl-lower alkyl group, particularly a benzyl group, and carbocyclic aryl groups, such as phenyl or naphthyl groups.

Aliphatic hydrocarbon radicals $R_1$ and $R_2$ can be substituted, e.g. by hydroxyl or cyano groups, lower alkoxy groups having preferably one to four carbon atoms, acyloxy groups, particularly lower alkanoyloxy groups such as the acetyloxy or propionyloxy group, phenoxy groups or halogens such as chlorine or bromine.

If substituents of the pyrimidine ring have further substituted benzene rings, then these can likewise contain the substituents specified at the beginning for the nucleus A especially however halogens such as fluorine, chlorine or bromine, sulphonic acid groups, lower alkyl or lower alkoxy groups or phenyl groups.

In preferred polycyclic dyestuffs of the formula I, the substituents $R_1$ and $R_2$ are each bound by way of an —NZ-bridge to the pyrimidine nucleus.

If Z represents a lower alkyl group, then this advantageously has one to four carbon atoms.

If —NZ—, together with the corresponding substituent $R_1$ or $R_2$, forms an heteroring, then this is preferably 5- to 6-membered and not aromatic. It is a question, for example, of the pyrrolidine or piperidine ring and — if this ring includes a further heteroatom — e.g. of the morpholino radical, or it is a question of a piperazine ring, optionally N'-substituted especially by alkyl groups, such as the N'-methyl piperazino or N'-ethyl piperazino radical.

Particularly valuable as dispersion dyestuffs are polycyclic dyestuffs of the formual I according to the invention, which are free of groups producing an acid reaction when dissociating in water and which promote water-solubility, and wherein in formula I the nucleus A is optionally substituted by the nitro group or halogen preferably chlorine, $Q_1$ and $Q_2$ represent each a —NZ-bridge and $R_1$ and $R_2$ are independently of each other lower alkyl, hydroxy-lower alkyl or cyclohexyl groups.

The new polycyclic dyestuffs of formula I are obtained by coupling the diazonium compound of an amine of the formula II,

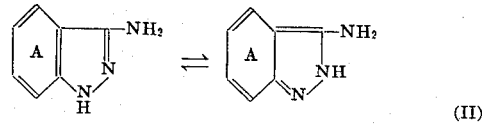

(II)

wherein the nucleus A has the meaning given under formula I, with a pyrimidine compound of the formula III,

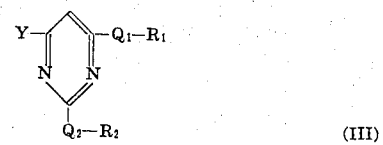

(III)

wherein Y denotes the radical of a nitrogen base bonded via nitrogen to the pyrimidine nucleus and $Q_1$, $Q_2$, $R_1$ and $R_2$ have the meanings given under formula I to form an azo compound of the formula IV,

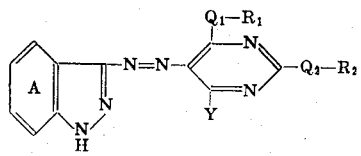

⇅

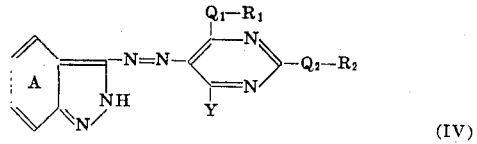

(IV)

and reacting this coupling product, with the splitting off of YH and cyclization, to give a polycyclic dyestuff of the formula I.

As a radical of a nitrogen base, Y denotes preferably a tertiary amino group, e.g. a lower dialkylamino group such as the dimethylamino, diethylamino or dipropylamino group, an N-lower alkyl-N-phenylamino group such as the N-methyl or N-ethyl-N-phenylamino group, a piperidino or morpholino group.

In this specification, including the claims, the term "lower" applied to "alkyl", "alkoxy" and "alkanoyl" groups or moieties means that such groups or moieties have at most five carbon atoms.

Suitable for carrying out the process according to the invention are diazo components of the formula II, e.g. optionally substituted 3-aminoindazoles such as 3-aminoindazole, 3-amino-5- or -6-nitroindazole, 3-amino-4- or -5-methylindazole, 3-amino-4,6-dimethylindazole, 3-amino-4- or -5-methoxyindazole, 3-amino-4-, -5- or -6-chloroindazole, 3-amino-5- or -6-bromo-indazole, 3-amino-5-methoxy-6-chloroindazole, as well as 3-aminoindazole-5-sulphonic acid.

Examples of particularly favorable pyrimidine coupling components of formula III are: 2,4,6-tris-dimethylaminopyrimidine, 2,4,6-tris-diethylaminopyrimidine, 2,4-bis-methylamino-6-dimethylaminopyrimidine, 2,4-bis-ethylamino-6-dimethylaminopyrimidine, 2,6-bis-dimethylamino-4-isopropylamino-pyrimioine, 2,4-bis-isopropylamino-6-dimethylaminopyrimidine, 2,4-bis-butylamino-6-dimethylaminopyrimidine, 2,6-bis-dimethylamino-4-sec.butylamino-pyrimidine, 2,6-bis-dimethylamino-4-cyclohexylamino-pyrimidine, 2,6-bis-dimethylamino-4-3',5',5'2,4-bis-cyclohexylamino-6-dimethylaminopyrimidine, 2,6-bis-dimethylamino-4-benzylamino-pyrimidine, 2,4-bis-benzylamino-6-dimethylamino-pyrimidine, 2,4-bis-ethylamino-6-(N-methyl-N-phenylamino)-pyrimidine, 2,4-bis-ethylamino-6-piperidino-pyrimidine, 2,4-bis-ethylamino-6-morpholino-pyrimidine, 2,4-bis-phenylamino-6-di-methylamino-pyrimidine, 2-ethylamino-4-phenylamino-6-dimethylamino-pyrimidine, 2-ethylamino-6-dimethylamino-4-(3'-sulphophenylamino)-pyrimidine, 2,6-bis-dimethylamino-4-phenylaminopyrimidine, 2,6-bis-dimethylamino-4-(4'-methylphenylamino)-pyrimidine, 2,6-bis-dimethylamino-4-(4'-methoxyphenylamino)-pyrimidine, 2,6-bis-dimethylamino-4-(4'-chlorophenylamino)-pyrimidine, 2,6-bis-dimethylamino-4-(3'-sulphophenylamino)-pyrimidine, 2,6-bis-dimethylamino-4-(1'-naphthylamino)-pyrimidine, 2,4-bis-β-hydroxyethylamino-6-dimethylamino-pyrimidine, 2,6-bis-dimethylamino-4-(β-cyanoethylamino)-pyrimidine, 2,6-bis-dimethylaminopyrimidine-4-phenylsulfide, 4-ethoxy-2,6-bis-dimethylaminopyrimidine, 2,4,6-tris-morpholino-pyrimidine, 2,4,6-tris-piperidino-pyrimidine, 2,4-bis-(3'-sulphophenylamino)-6-dimethylaminopyrimidine, 2-(β-hydroxyathylamino)-4-(3'-sulphophenylamino)-6-dimethylamino-pyrimidine, 2-amino-4-(3'-sulphophenylamino)-6-dimethylamino-pyrimidine, 2,4,6-tris-N-methyl-N-isopropylamino-pyrimidine and 2,4,6-tris-N-methyl-N-β-hydroxyethylamino-pyrimidine.

The pyrimidine compounds according to the invention, usable as coupling components, are produced according to known methods, e.g. by reaction in an aqueous medium of the three chlorine atoms of the 2,4,6-trichloropyrimidine successively with ammonia, primary or secondary aliphatic, cycloaliphatic, araliphatic or carbocyclic-aromatic amines or with a metal salt of an aliphatic, cycloaliphatic, araliphatic or carbocyclic-aromatic hydroxyl or mercapto compound. Preferably, less reactive amines are used in the first step and in the second and third step, ammonia and/or easily reacting, more strongly basic amines and alcoholates, phenolates and mercaptanes are used in any desired sequence.

In some cases, the products obtained from the first step are mixtures of isomers 2-amino-4,6-dichloropyrimidines and 4-amino-2,6-dichloropyrimidines which, if desired, can be separated by recrystallization or by chromatographic adsorption, e.g. on aluminum oxide or silica gel. This separation is, however, not necessary as mixtures of isomers may be used. These yield mixtures of dyestuffs according to the invention, which are suitable for commercial purposes.

The coupling of the diazonium compound of an amine of the formula II with the pyrimidine coupling component of the formula III is performed according to the usual methods, preferably in acid, aqueous or organic-aqueous medium, especially with a pH-value of 2–6. To isolate the coupling product, in the case of mineral acid coupling, the acid is gradually buffered, for example with alkali salts of lower fatty acids, such as sodium acetate.

The reaction of an coupling product (azo compound) of the formula IV with splitting off of YH and cyclization to give a polycyclic dyestuff of the formula I can be performed, for example, by heating the coupling product of formula IV in inert organic solvents, which boil above 100°C but it is advantageously performed optionally by heating in acid, aqueous or aqueous-organic medium.

The coupling product can be directly further reacted without isolation by heating of the acid coupling mixture. In some cases it is convenient to isolate the coupling product beforehand. The isolated product is then advantageously introduced into an organic solvent or into an acid, aqueous, organic-aqueous or organic solution and, by subsequent heating, cyclized to a polycyclic dyestuff of the formula I.

The reaction temperature can be between 50° and 150°C, depending on the type of reaction medium.

Suitable as organic solvents are water-miscible alcohols, especially lower alcohols such as methanol, ethanol or isopropanol, ethylene glycol monomethyl ether or -monoethyl ether, cyclic ethers such as dioxane or tetrahydrofuran, amides of lower fatty acids such as dimethylformamide, or lower aliphatic sulphoxides such as dimethylsulphoxide.

Suitable organic and inorganic acids are, e.g. lower fatty acids such as acetic acid or formic acid, hydrochloric acid, sulphuric acid, phosphoric acid or nitric acid.

The reaction can be performed by heating the isolated coupling product to 100° to 150°C in a high-boiling organic solvent. Suitable high-boiling organic solvents are, e.g. optionally halogenated or nitrated aromatic hydrocarbons such as toluene, xylene, chlorobenzene, o-dichlorobenzene or nitrobenzene, higher alcohols such as amyl alcohol, cyclohexanol or benzyl alcohol.

The new polycyclic dyestuffs of the formula I crystalline out usually from the reaction mixture. They are obtained by filtration or removal of the organic solvent by distillation or steam distillation and, if necessary, they can be purified, e.g. from dimethylformamide, ethanol, isopropanol or chlorobenzene. Polycyclic dyestuffs of the formula I according to the invention, which contain no groups dissociating in water with an acid reaction, such as sulphonic acid groups, are difficultly soluble or insoluble in water. They are, on the other hand, soluble in organic solvents such as dioxane, ethylene glycol monomethyl ether, dimethylformamide, dimethylsulphoxide, chlorobenzene, o-dichlorobenzene, ethanol, isopropanol and chloroform. The organic solutions of the new polycyclic dyestuffs exhibit, in ultraviolet light and in daylight, a yellowish-green fluorescence.

These polycyclic dyestuffs are finely crystalline, yellow dyestuffs, and are suitable for the dyeing and printing of hydrophobic, synthetic organic fiber material, e.g. for the dyeing of textile material made from high molecular organic esters, such as cellulose-2 ½ - or -triacetate, especially however for the dyeing or printing of textile material made of polymeric esters of aromatic polycarboxylic acids with polyvalent alcohols, particularly of polyethylene glycol terephthalate or polycyclohexane dimethylol terephthalate, or textured polyester fibers such as e.g. Diolen Loft, Crimplene and Schapira.

These dyestuffs can, however, also be used for dyeing synthetic polyamide fibers such as polyhexamethylene adipinamide, polycaprolactam or polyamino undecanoic acid, as well as for dyeing polyolefines, especially polypropylene fibers. Furthermore, depending on the composition, they are suitable for the solution dyeing or pigmenting of lacquers, oils and waxes, as well as of cellulose derivatives, particularly cellulose esters such as cellulose-acetate.

Preferably, the dyeing of the stated fiber materials using the difficultly water-soluble dyestuffs, according to the invention, is performed from an aqueous dispersion. It is therefore advantageous to finely break up end materials of the formula I, usable as dispersion dyestuffs, by grinding them with surface-active dispersing agents and possibly with further grinding auxiliaries.

Suitable anionic dispersing agents are, e.g. the alkylarylsulphonates, the condensation products of formaldehyde with naphthalene sulphonic acid, the lignin sulphonates. Non-ionogenic dispersing agents suitable for that purpose are, e.g. the fatty alcohol or alkylphenyl polyglycol ethers having a higher alkyl radical.

The dyeing of the polyester fibers with the difficultly water-soluble dyestuffs, according to the invention, from aqueous dispersion is carried out by the usual methods for polyester materials. Polyesters of aromatic polycarboxylic acids with polyvalent alcohols are preferably dyed at temperatures of over 100°C under pressure. Dyeing can however also be performed at the boiling point of the dyeliquor in the presence of dye carriers, e.g. alkali metal phenylphenolates, polychlorobenzene compounds or of similar auxiliary agents, or it can be performed using the pad-dyeing process with a subsequent aftertreatment at temperature, e.g. thermofixing at 180°–210°C. Cellulose-2 ½-acetate fibers are dyed preferably at temperatures of 80°–85C, whilst cellulose-triacetate fibers, as well as synthetic polyamide fiber material, are advantageously dyed at the boiling point of the dye liquor. The use of dye carriers is unnecessary for the dyeing of the latter mentioned fiber types.

The printing too of the mentioned textile materials is performed by the usual methods by printing the material with the printing paste, which contains, in addition to the dyestuff and the dyeing accelerator, also thickeners and the usual additives such as, e.g. urea, and subsequently fixing the dyestuff by steaming at 100–130°C for 15 minutes.

The polycyclic dyestuffs of the formula I, usable as dispersion dyestuffs, go very well on to the aforesaid hydrophobic organic fiber material, especially on to polyethylene glycol terephthalate fibers and, on this fiber material, they produce pure, deeply colored greenish-yellow, yellow and reddish-yellow dyeings of high brilliancy and fluorescence. The dyeings have, moreover, a good fastness to washing, milling, rubbing, perspiration, solvents, decatizing, light and sublimation.

Polycyclic dyestuffs of the formula I, according to the invention, are distinguished in particular by a high color strength and brilliancy, combined with a very good fastness to light and sublimation of dyeings produced therewith on polyethylene glycol terephthalate fibers and have additional good levelling and buildup properties on textured polyester fibers.

Those compounds of the formula I, which contain groups dissociating in water with an acid reaction, e.g. sulphonic acid groups, can be used from an acid to neutral bath for the dyeing or printing of natural polyamide fibers such as wool, or synthetic polyamide fibers such as nylon, as well as textured synthetic polyamide fibers such as e.g. Banlon.

The following non-limitive Examples illustrate the invention. The temperatures are given therein in degrees Centigrade, and the analysis values are given in per cent (%).

EXAMPLE 1

8.9 g of 3-amino-5-nitroindazole are introduced into 150 ml of water while adding a few drops of dispersing agent, whereafter 35 ml of concentrated hydrochloric acid are admixed. The mixture is heated to 75° while stirring whereupon a yellow-brown solution is formed. This solution is then cooled to 10°, about 20 g of crushed ice are added and diazotization is effected at about 2°–5° with a solution of 3.5 g of sodium nitrite in 10 ml of water. Thereby the diazonium salt of 3-amino-5-nitroindazole precipitates in the form of fine flakes. To this suspension a solution of 10.0 g of 2,4,6-tris-dimethylaminopyrimidine in 10 ml of water and 7.5 g of concentrated hydrochloric acid are added. After completion of the coupling the reaction mixture is heated for 1 hour to 95°–100° and then cooled whereupon the finely crystalline precipitate formed is filtered off. The precipitate is washed with water and dried.

By this means are obtained 17.8 g of a yellow dyestuff of the formula

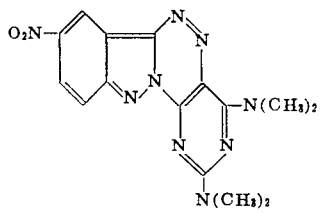

After recrystallization from dimethylformamide, yellow needles are obtained having a melting point of >350°.

Analysis for $C_{15}H_{15}N_9O_2$
Calculated: C: 51.0 H: 4.25 N: 35.7
obtained: C: 51.21 H: 4.32 N: 35.9

From a fine aqueous dispersion, this dyestuff dyes polyethylene glycol terephthalate fibers in pure, fluorescent yellow shades. The dyeings are fast to light, rubbing, washing and particularly to sublimation.

The 3-amino-5-nitroindazole used as starting product is obtained, e.g. by reacting 2-chloro-5-nitro-benzonitrile with hydrazine hydrate in boiling alcohol in a manner analogous to that described in E.W. Parnell Soc. 1959/2363.

EXAMPLE 2

If, in example 1, 15.1 g of 2.4-bis-cyclohexylamino-6-dimethylaminopyrimidine are used instead of 10 g of 2,4,6-tris-dimethylaminopyrimidine, with the procedure being otherwise as in Example 1, then 23.1 g of a yellow dyestuff are obtained of the formula

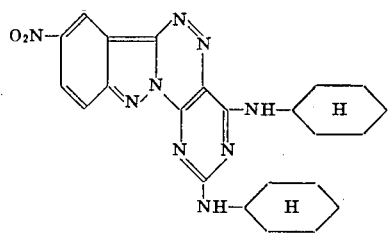

The new dyestuff crystallizes from dimethylformamide in the form of yellow needles, M.P. 290°–292°.

Analysis for $C_{23}H_{27}N_9O_2 + \frac{1}{2} H_2O$
calculated: c 58.8 H 5.96 N 26.8 $H_2O$ 1.9
obtained: C 58.96 H 5.88 N 26.59 $H_2O$ 1.86

The dyestuff dyes polyethylene glycol terephthalate fibers from aqueous fine dispersion in bright yellow, fluorescent shades which are fast to light.

EXAMPLE 3

4.2 g of 3-amino-6-chloroindazole are diazotized in the usual manner. To a solution of 5.22 g of 2,4,6-tris-dimethylaminopyrimidine in 200 ml of 50 % acetic acid is then added, the yellow suspension of diazotized 3-amino-6-chloroindazole and the reaction mixture is stirred till the end of the coupling at room temperature. It is subsequently heated to 90°–95° and maintained for a further hour at 90°–95°. The obtained fine lemon-yellow crystals are filtered off, washed with water and dried. By recrystallization from dimethylformamide are obtained 8 g of a dyestuff of the formula

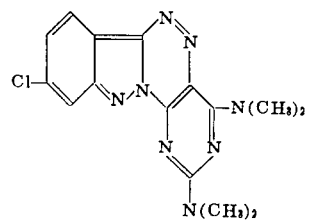

in the form of lemon-yellow needles, M.P. 288°–289°.

Analysis for $C_{15}H_{15}N_8Cl$
calculated C 52.6 H 4.38 N 32.7 Cl 10.36
obtained C 52.62 H 4.55 N 32.5 Cl 10.45

The dyestuff dyes polyethylene glycol terephthalate fibers in brightly fluorescent yellowish-green shades.

EXAMPLE 4

6.6 g of 3-aminoindazole are dissolved in 200 g of water and 18 ml of concentrated hydrochloric acid and diazotized at 0°–5° with 50 ml of a 1N sodium nitrite solution. The obtained diazonium salt solution is added dropwise to a solution of 15 g of 2,4-bis-ethylamino-6-(N-methyl-N-phenylamino)-pyrimidine in 300 ml of 50% acetic acid. The mixture is stirred for 1 hour, the pH value adjusted to 4 with sodium hydroxide solution and the obtained coupling product filtered off. The still moist filtrate is slurried in 800 ml of ethanol and heated to boiling. 30 ml of concentrated hydrochloric acid are then added dropwise whereby in a short time a clear solution is obtained. The reaction mixture is then stirred for a further 2 hours while gently boiling. The mixture is cooled to room temperature and the formed yellow, finely crystalline precipitate is filtered off. The latter is washed with ethanol and dried. By recrystallization from dimethylformamide are obtained 13.4 g of dyestuff of the formula

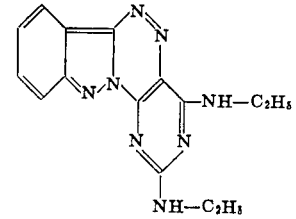

in the form of fine yellow needles, M.P. 289°–291°.
Analysis for $C_{15}H_{16}N_8$
calculated C 58.4 H 5.2 N 36.1
obtained: C 58.39 H 5.26 N 35.86

The dyestuff dyes polyethylene glycol terephthalate fibers from fine aqueous dispersion in brightly fluorescent, yellowish-green shades.

The same dyestuff is obtained if, in the above example, equivalent amounts of 2,4-bis-ethylamino-6-dimethylaminopyrimidine, 2,4-bis-ethylamino-6-piperidino-pyrimidine or 2,4-bis-ethylamino-6-morpholinopyrimidine are used instead of 15 g of 2,4-bis-ethylamino-6-(N-methyl-N-phenylamino)-pyrimidine.

If, in the previous examples 1 to 4, the diazo component is replaced by the corresponding amount of one of the indazole diazo components given in column 2 of the following Table I, and this is combined, under the conditions described in the above examples, with corresponding amounts of one of the pyrimidine coupling component listed in column 3, then dyestuffs are thus obtained which, on polyethylene glycol fibers, fibers produce dyeings having similarly good properties. The shades of the dyeings are given in the last column of the Table I.

TABLE I

| Ex. No. | Indazole diazecomponents | Pyrimidin coupling components | Shade on polyethyleneglycol-terephthalate fibres |
|---|---|---|---|
| 5 | 3-aminoindazole | 2-ethylamino-4-phenyl-amino-6-dimethylamino-pyrimidino. | Yellow. |
| 6 | do | 2,6-bis-dimethylamino-4-phenylaminopyrimidine. | Do. |
| 7 | do | 2,6-bis-dimethylamino-4-naphthyl-1'-aminopyrimidine. | Do. |
| 8 | 3-amino-5-nitroindazole. | 2,6-bis-dimethylamino-4-(4'-methoxyphenylamino)-pyrimidine. | Do. |
| 9 | do | 2,4,6-tris-diethylamino-pyrimidine. | Do. |
| 10 | do | 2,4-bis-isopropylamino-6-dimethylaminopyrimidine. | Do. |
| 11 | do | 2,6-bis-dimethylamino-4-benzylaminopyrimidine. | Do. |
| 12 | do | 2,4-bis-phenylamino-6-dimethylaminopyrimidine. | Reddish yellow. |
| 13 | do | 2,4-bis-benzylamino-6-dimethylaminopyrimidine. | Yellow. |
| 14 | do | 2,4-bis-butylamino-6-dimethylaminopyrimidine. | Do. |
| 15 | 3-amino-4,6-dimethylindazole. | 2,4,6-tris-dimethylaminopyrimidine. | Greenish yellow. |
| 16 | 3-amino-4-chloroindazole. | 2,4-bis-ethylamino-6-dimethylaminopyrimidine. | Do. |
| 17 | 3-amino-5-chloroindazole. | 2,6-bis-dimethylamino-4-phenylaminopyrimidine. | Yellow. |
| 18 | 3-amino-6-chloroindazole. | do | Do. |
| 19 | 3-amino-5-methoxyindazole. | 2,4,6-tris-dimethylaminopyrimidine. | Do. |
| 20 | 3-amino-5-methoxy-6-chloroindazole. | do | Do. |
| 21 | 3-amino-5-nitroindazole. | 2,6-bis-dimethylamino-4-(4'-methylphenylamino)-pyrimidine. | Do. |
| 22 | do | 2,6-bis-dimethylamino-4-(4'-chlorophenylamino)-pyrimidine. | Do. |
| 23 | do | 2,4-bis-β-hydroxyethyl-amino-6-dimethylamino-pyrimidine. | Do. |
| 24 | do | 2,6-bis-dimethylamino-4-(β-cyanoethylamino)-pyrimidine. | Do. |
| 25 | do | 2,6-bis-dimethylamino-pyrimidine-4-phenyl-sulfide. | Do. |
| 26 | do | 4-ethoxy-2,6-bis-dimethyl-aminopyrimidine. | Do. |
| 27 | 3-amino-6-bromoindazole. | 2,4,6-trismorpholino-pyrimidine. | Do. |
| 28 | 3-amino-5-nitro-indazole. | 2,4,6-trispiperidino-pyrimidine. | Do. |
| 29 | 3-amino-6-chloro-indazole. | 2,4-bis-cyclohexylamino-5-dimethylamino-pyrimidine. | Do. |
| 30 | 3-amino-indazole | 2,4,6-tris-dimethylamino-pyrimidine | Do. |
| 31 | 3-amino-5-nitro-indazole. | 2,4,6-tris-N-methyl-N-isopropylaminopyrimidine. | Do. |
| 32 | do | 2,4,6-tris-N-β-hydroxy-athylamino-pyrimidine. | Do. |

EXAMPLE 33

An amount of 17,8 g of 3-amino-5-nitroindazole is dissolved in 300 ml of water and 70 ml of concentrated hydrochloric acid at 75°. The solution is then cooled to 10°, and to it are added crushed ice until a temperature of 2°–5° is attained; to the solution is then added a solution of 7,0 g of sodium nitrite in 20 ml of water. Stirring is maintained for 2 hours, and to the thus obtained suspension of the diazotized 3-amino-5-nitroindazole is then added a solution of a mixture of 12,5 g of 2,6-bis-dimethylamino-4-isopropylamino-pyrimidine and 9,8 g of 4,6-bis-dimethylamino-2-isopropylamino-pyrimidine in 20 ml of water and 16ml of concentrated hydrochloric and. The reaction mixture is stirred for 1 hour; it is then heated for 1 hour to 90°–95°, allowed to cool, and the formed yellow precipitate filtered off. This is washed with water until neutral, and afterwards dried. In this manner are obtained 36 g of a yellow dyestuff the composition of which corresponds to the formulae

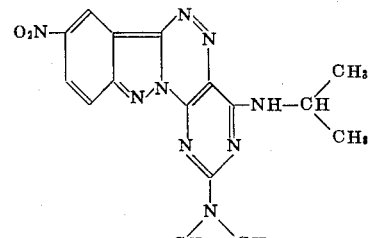

and

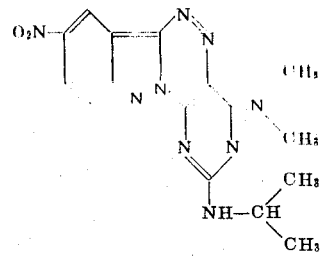

This dyestuff dyes, from a fine aqueous dispersion, polyethylene glycol terephthalate fibers in pure, fluorescent yellow shades. The dyeings have fastness to light, rubbing, washing, and especially to sublimation. Furthermore, the dyestuff is distinguished by a particularly good build-up property on textured polyester fibers, e.g. Crimplene.

The mixture of 2,6-bis-dimethylamino-4-isopropylamino-pyrimidine and 4,6-bis-dimethylamino-2-isopropylamino-pyrimidine used in this example as coupling component is obtained as follows:

An amount of 130 g of isopropylamine is added dropwise within 1 hour at 15°–20°, with cooling, to 183.5 g of 2,4,6-trichloropyrimidine in 350 ml of water. Stirring is maintained for 10–12 hours at room temperature, and the oily phase is separated from the water. 206 g of the obtained mixture of 2,6-dichloro-4-isopropylamino and 4,6-dichloro-2-isopropylaminopyrimidine are then stirred up with 150 ml of water. To this mixture are added at 40°–45°, within 30 minutes, 100 g of dimethylamine as a 40% aqueous solution; and after the exothermic reaction has subsided, stirring continues for a further 3 hours at 80°–85. After cooling, 214 g of white crystals, M.P. 62°–70, of an isomer mixture of 2-dimethylamino-4-isopropylamino-6-chloro- and 2-isopropylamino-4-dimethylamino-6-chloro-pyrimidine are obtained. The whole yield is subsequently heated together with 100 g of dimethylamine, as a 40% aqueous solution, for 10 hours in an autoclave to 150°–160°. Obtained after cooling are 220–225 g of an isomer mixture of 2,6-bis-dimethylamino-4-isopropylamino- and 4,6-bis-dimethylamino-2-isopropylamino-pyrimidine, in a ratio of 56 : 44 percent, as a white crystal mass.

If, in the above example, the 17.8 g of 3-amino-5-nitro-indazole are replaced by an equivalent amount of one of the indazolediazo components listed in Column 2 of the following Table II, and this is coupled, using otherwise the same procedure, with any of the mixtures of pyrimidine coupling components given in Column 3, then dyestuffs are obtained which produce on polyethylene glycol terephthalate fibers dyeings having similarly good properties, the shades of the dyeings on polyethylene glycol terephthalate fibers being given in the last column of Table II.

TABLE II

| Ex. No. | Indazolediazo components | Pyrimidine coupling components | Shade on polyethylene glycol terephthalate fibres |
|---|---|---|---|
| 34 | 3-amino-Indazole. | 13.3 g. 2,6-bis-dimethylamino-4-sec. butylaminopyrimidine; 10.4 g. 4,6-bis-dimethylamino-2-sec. butylaminopyrimidine. | Yellow. |
| 35 | do | 14.7 g. 2,6-bis-dimethylamino-4-cyclohexylaminopyrimidine; 15.5 g. 4,6-bis-dimethylamino-2-cyclohexylaminopyrimidine. | Do. |
| 36 | do | 14.8 g. 2,6-bis-dimethylamino-4-n-hexylaminopyrimidine; 11.7 g. 4,6-bis-dimethylamino-2-n-hexylaminopyrimidine. | Do. |
| 37 | do | 13.5 g. 2,6-bis-dimethylamino-4-(γ-ethoxy-propylamino)-pyrimidine; 11,0 g. 4,6-bis-dimethylamino-2-(γ-ethoxy-propylamino)-pyrimidine. | Do. |
| 38 | do | 13.3 g. 2,6-bis-dimethylamino-4-tert. butylaminopyrimidine; 10.4 g. 4,6-bis-dimethylamino-2-tert. butylaminopyrimidine. | Do. |
| 39 | 3-amino-5-nitroindazole. | 13.3 g. 2,6-bis-dimethylamino-4-n-butylaminopyrimidine; 10.4 g. 4,6-bis-dimethylamino-2-n-butylaminopyrimidine. | Do. |
| 40 | do | 12.5 g. 2,6-bis-dimethylamino-4-n-propylaminopyrimidine; 9.8 g. 4,6-bis-dimethylamino-2-n-propylaminopyrimidine. | Do. |
| 41 | do | 13.3 g. 2,6-bis-dimethylamino-4-isobutylaminopyrimidine; 10.4 g. 4,6-bis-dimethylamino-2-isobutylaminopyrimidine. | Do. |
| 42 | do | 13.3 g. 2,6-bis-dimethylamino-4-sec. butylaminopyrimidine; 10.4 g. 4,6-bis-dimethylamino-2-sec. butylaminopyrimidine. | Do. |
| 43 | do | 14.7 g. 2,6-bis-dimethylamino-4-cyclohexylaminopyrimidine; 11.5 g. 4,6-bis-dimethylamino-2-cyclohexylaminopyrimidine. | Do. |
| 44 | 3-amino-5-chlorindazole. | 17.1 g. 2,6-bis-dimethylamino-4-(3',5',6'-trimethylcyclohexylamino)-pyrimidine; 13.4 g. 4,6-bis-dimethylamino-2-(3',5',6'-trimethylcyclohexylamino)-pyrimidine. | Do. |
| 45 | do | 12.5 g. 2,6-bis-dimethylamino-4-isopropylaminopyrimidine; 9.8 g. 4,6-dimethylamino-2-isopropylamino-pyrimidine. | Do. |
| 46 | do | 14.7 g. 2,6-bis-dimethylamino-4-cyclohexylaminopyrimidine; 11.5 g. 4,6-bis-dimethylamino-2-cyclohexylaminopyrimidine. | Do. |
| 47 | do | 13.3 g. 2,6-bis-dimethylamino-4-sec. butylaminopyrimidine; 10.4 g. 4,6-bis-dimethylamino-2-sec. butylaminopyrimidine. | Do. |
| 48 | 3-amino-6-chlorindazole. | 13.3 g. 2,6-bis-dimethylamino-4-isobutylaminopyrimidine; 10.4 g. 4,6-bis-dimethylamino-2-isobutylaminopyrimidine. | Do. |
| 49 | 3-amino-5-nitroindazole. | 13.3 g. 2,6-bis-dimethylamino-4-tert. butylaminopyrimidine; 10.4 g. 4,6-bis-dimethylamino-2-tert. butylaminopyrimidine. | Do. |
| 50 | 3-amino-5-nitroindazole. | 12.7 g. 2,6-bis-dimethylamino-4-β-hydroxy-ethylamino-pyrimidine; 9.9 g. 4,6-bis-dimethylamino-2-β-hydroxy-ethylamino-pyrimidine. | Do. |

EXAMPLE 51

6.6 g of 3-aminoindazole are diazotized as described in Example 4. The obtained diazonium salt solution is added dropwise to a solution of 17.0 g of 2,6-bis-dimethylamino-4-(3'-sulphophenylamino)-pyrimidine in 200 ml of methanol and 15 ml of concentrated sodium hydroxide solution. After coupling has finished, the reaction mixture is acidified with concentrated hydrochloric acid. The reaction mixture is heated until the methanol is distilled off, then heated to 90°–95° and maintained at this temperature for 1 hour while stirring. It is cooled to room temperature, whereupon the formed precipitate is filtered off and dried.

20 g of yellowish-brown crystals are obtained of a dyestuff of the formula

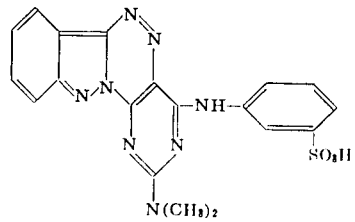

The dyestuff dyes synthetic polyamide fibers and wool in fluorescent brightly yellow shades.

Polycyclic dyestuffs having similar properties are obtained if, instead of the diazo and coupling components given in Example 51, equivalent amounts of the indazole diazo components listed in Table III, column 2, are reacted with equivalent amounts of the pyrimidine coupling components given in column 3, analogously to the procedure described in the example. The shades of the dyeings, obtained with these dyestuffs on polyamide fibers, are given in the last column of the Table III.

TABLE III

| Ex. No. | Indazole diazo components | Pyrimidine coupling components | Shade on polyamide fibres |
|---|---|---|---|
| 52 | 3-amino-5-nitroindazole. | 2,6-bis-dimethylamino-4(3'-sulphophenylamino)-pyrimidine. | Yellow. |
| 53 | 3-amino-6-chloroindazole. | do | Do. |
| 54 | 3-amino-5-nitroindazole. | 2-ethylamino-6-dimethylamino-4-(3'-sulphophenylamino)-pyrimidine. | Do. |
| 55 | do | 2,4-bis(3'-sulphophenylamino)-6-dimethylaminopyrimidine. | Reddish yellow. |
| 56 | do | 2-(β-hydroxyethylamino)-4-(3'-sulpho-phenylamino)-6-dimethylaminopyrimidine. | Yellow. |
| 57 | do | 2,6-bis-dimethylamino-4-(3'-sulphophenylamino)-pyrimidine. | Do. |
| 58 | do | 2-amino-4-(3'-sulphophenylamino)-6-dimethylamino-pyrimidine. | Do. |

EXAMPLE 59

10.6 g of 3-aminoindazole-5-sulphonic acid are suspended in 200 ml of water and 18 ml of conc. hydrochloric acid and at a temperature of 0° to 5° by addition of 50 ml of a 1N sodium nitrite solution diazotized. The obtained diazonium salt solution is added dropwise to a solution of 10.7 g of 2,4,6-tris-dimethylamino-pyrimidine in 200 ml of methanol and 15 ml of concentrated sodium hydroxide solution. After coupling has finished, the reaction mixture is acidified with concentrated hydrochloric acid. The reaction mixture is heated until the methanol is distilled off, then heated to 90°–95° and maintained at this temperature for 1 hour while stirring. It is cooled to room temperature, whereupon the formed precipitate is filtered off and dried.

Yellowish-brown crystals are obtained of a dyestuff of the formula

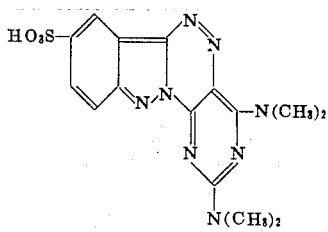

The dyestuff dyes synthetic polyamide fibers and wool in fluorescent brightly yellow shades.

The 3-aminoindazole-5-sulphonic acid used as starting material is obtained by introducing 3-aminoindazole under slight cooling into sulphonic acid having a content of about 15 percent of $SO_3$, stirring at room temperature for 10-12 hours and finally pouring the mixture on 250 g of crushed ice. After a short time the 3-aminoindazole-5-sulphonic acid precipitates from the solution in the form of glittering scales. The residue is filtered, washed with water and dried. Yield about 90 percent of the theoretical.

EXAMPLE 60

In a pressure-dyeing apparatus, 2 g of the dyestuff, obtained according to Example 2, are finely suspended in 2,000 ml of water containing 4 g of oleylpolyglycol ether. The pH-value of the dyebath is adjusted to 5–5.5 with acetic acid.

100 g of fabric made of polyethylene glycol terephthalate are introduced at 50°, the bath is heated within 30 minutes to 140° and dyeing proceeds for 50 minutes at this temperature. The dyeing is subsequently rinsed with water, soaped and dried. By maintaining these conditions, a pure, fluorescent, yellow dyeing is obtained which is fast to washing, light, perspiration and sublimation.

The dyestuffs described in the other Examples produce, using this process, dyeings of equal quality.

EXAMPLE 61

2 g of the dyestuff, obtained according to Example 1, are dispersed in 4,000 ml of water. To this dispersion are added, as swelling agent, 12 g of sodium-o-phenylphenolate and also 12 g of diammonium phosphate, whereupon 100 g of yarn made from polyethylene glycol terephthalate are dyed therein for 1 ½ hours at 95°–98. The dyeing is rinsed and subsequently treated with diluted sodium hydroxide solution and a dispersing agent.

In this manner is obtained a brilliant, fluorescent yellow dyeing, which is fast to washing, light and sublimation.

If, in the above Example, the 100 g of polyethylene glycol terephthalate yarn are replaced by 100 g of cellulose triacetate fabric, with the material being dyed under the stated conditions and subsequently rinsed with water, a yellow dyeing of the highest brilliancy is obtained, which has very good fastness to light and sublimation.

EXAMPLE 62

Polyethylene glycol terephthalate fabric (such as "Dacron"), is impregnated on a padding machine at 40° with a dyeliquor having the following composition:

20 parts by weight of the dyestuff obtained according to Example 1, finely dispersed in
7.5 parts by weight of sodium alginate,
20 parts by weight of triethanolamine,
20 parts by weight of octylphenol polyglycol ether and
900 parts by weight of water.

The fabric, squeezed out to a content of ca. 100 percent impregnating liquor, is dried at 100° and subsequently fixed during 30 seconds at a temperature of 210°. The dyed material is rinsed with water, soaped and dried. Under these conditions, a brilliant, fluorescent, greenish-yellow dyeing is obtained which is fast to washing, rubbing, light and sublimation.

The dyestuffs described in the other examples produce, using this process, dyeings of an equally high quality.

EXAMPLE 63

100 g of "Banlon"-knitted fabric are introduced at 40° into a dyebath containing, in 5,000 ml of water, 1 g of the dyestuff, obtained according to Example 51 and 3 ml of 85% formic acid. While stirring well, the bath is heated within 30 minutes to boiling and the material is dyed during 1 hour at the boiling point. The dyed material is then carefully rinsed and dried. A pure brilliant, deeply colored, yellow dyeing is obtained having a good fastness to light and perspiration.

EXAMPLE 64

100 g of a well pre-wetted wool are introduced at 50° into a dyebath containing, in 5,000 ml of water, 1 g of the dyestuff obtained according to Example 52, 5 g of sodium sulphate and 3 ml of 40 percent acetic acid. The bath is heated within 15 minutes to boiling and the material is dyed during 1 hour at the boiling point. With complete exhaustion of the dyeliquor is obtained a pure, brilliant and fluorescent yellow wool dyeing.

We claim:
1. A dyestuff of the formula

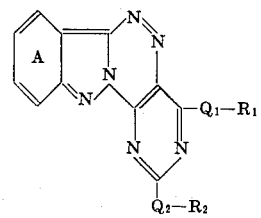

wherein the nucleus
A may be unsubstituted or substituted by a member selected from the group consisting of nitro, halogen, lower alkoxy and sulpho or by any two different members of said group or by one or two lower alkyl groups,
one of the bridging members —$Q_1$— and —$Q_2$— represents an —NZ-bridge and the other bridging member represents oxygen, sulphur or the —NZ-bridge wherein Z represents hydrogen or lower alkyl,
each of $R_1$ and $R_2$ represents, independently of the other, hydrogen, lower alkyl, phenyl-lower alkyl, hydroxy-lower alkyl, cyano-lower alkyl, cycloalkyl, phenyl, naphthyl or phenyl substituted by lower alkoxy, lower alkyl, halogen or sulpho, or any of $Q_1R_1$ and $Q_2R_2$ represents morpholino or piperidino.

2. A dyestuff as defined in claim 1, wherein the nucleus A is unsubstituted or substituted by a member selected from the group consisting of nitro and chlorine, $Q_1$ and $Q_2$ each represents a —NZ-bridge and $R_1$ and $R_2$ are, independently of each other, lower alkyl, hydroxy-lower alkyl or cyclohexyl.

3. A dyestuff as defined in claim 1 having the formula

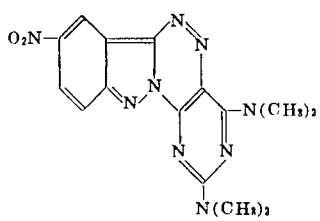

4. A dye stuff as defined in claim 1, which consists of a mixture of the two isomers having the formulas

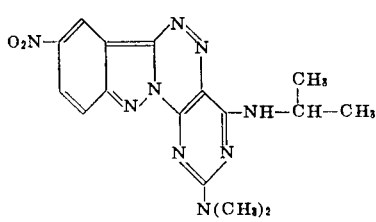

and

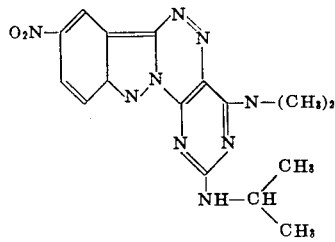

5. A dyestuff as defined in claim 1 having the formula

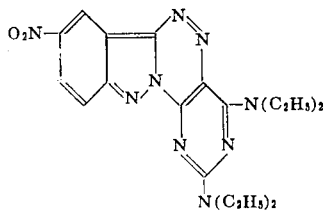

6. A dyestuff as defined in claim 1, which consists of a mixture of the two isomers having the formulas

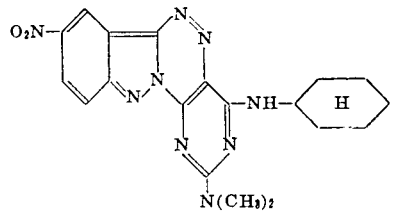

and

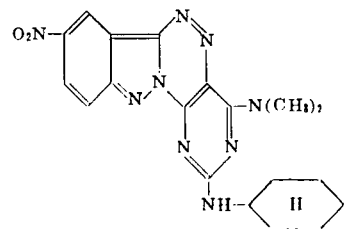

7. A dyestuff as defined in claim 1, which consists of a mixture of the two isomers having the formulas

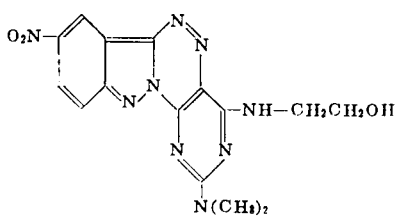

and

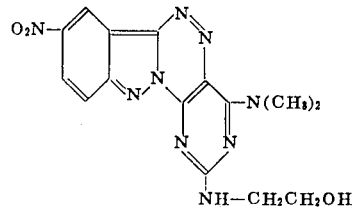

8. A dyestuff as defined in claim 1 having the formula

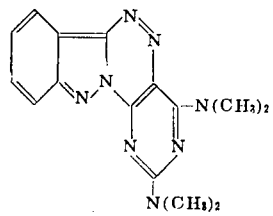

* * * * *